(12) United States Patent
Beyeler et al.

(10) Patent No.: US 7,712,366 B2
(45) Date of Patent: May 11, 2010

(54) MULTI-AXIS CAPACITIVE TRANSDUCER AND MANUFACTURING METHOD FOR PRODUCING IT

(75) Inventors: Felix Beyeler, Regensdorf (CH);
Bradley J. Nelson, Zumikon (CH); Yu Sun, Toronto (CA)

(73) Assignee: Eth Zuerich, Zurich (CH)

( * ) Notice: Subject to any disclaimer, the term of this patent is extended or adjusted under 35 U.S.C. 154(b) by 150 days.

(21) Appl. No.: 11/628,899

(22) PCT Filed: May 27, 2005

(86) PCT No.: PCT/EP2005/005770
§ 371 (c)(1),
(2), (4) Date: Sep. 25, 2008

(87) PCT Pub. No.: WO2005/121812
PCT Pub. Date: Dec. 22, 2005

(65) Prior Publication Data
US 2009/0007668 A1     Jan. 8, 2009

Related U.S. Application Data
(60) Provisional application No. 60/578,079, filed on Jun. 9, 2004.

(51) Int. Cl.
*G01P 15/125* (2006.01)
(52) U.S. Cl. .................... 73/514.32; 324/662
(58) Field of Classification Search .............. 73/514.32; 156/272.2; 324/661, 662
See application file for complete search history.

(56) References Cited

U.S. PATENT DOCUMENTS

| | | | | |
|---|---|---|---|---|
| 4,369,663 A | * | 1/1983 | Venturello et al. | ..... 73/862.043 |
| 4,719,538 A | * | 1/1988 | Cox | ......... 361/283.2 |
| 4,860,232 A | * | 8/1989 | Lee et al. | ..... 702/104 |

(Continued)

OTHER PUBLICATIONS

Lemkin et al.; „A 3-axis force balanced accelerometer using a single proof-mass; 1997 International Conference on Solid-State Sensors and actuators. Digest of Technical Papers. Chicago, IL, Jun. 16-19, 1997. Sessions 3A1-4D3. vol. 2, Jun. 16, 1997; pp. 1185-1188; XP-010240691; ISBN: 0-7803-3829-4.

Sun Yu et al.; "A bulk microfabricated multi-axis capacitive cellular force sensor using transverse comb drives"; Database compendex 'Online!., Engineering Information, Inc., New York, NY, US. XP-002343174; Database accession No. E2002497256212 -& J Micromech Microengineering; Journal of Micromechanics and Microengineering; Nov. 2002 vol. 12, No. 6, Nov. 2002; pp. 832-840; XP-002343140; p. 833, right-hand column, figures 1,2,9.

*Primary Examiner*—Daniel S Larkin
*Assistant Examiner*—Samir M Shah
(74) *Attorney, Agent, or Firm*—Laurence A. Greenberg; Werner H. Stemer; Ralph E. Locher

(57) ABSTRACT

A capacitive transducer a first part containing a first set of capacitor plates and a second part relatively movable in a plane to the first part. The second part contains a second set of capacitor plates. Both sets of capacitor plates are built on a substrate, wherein the capacitor plates form a plurality of capacitors. The second part is relatively movable in all six degrees of freedom. One set of the plurality of capacitors measures displacements in a plane and a second set of the plurality capacitors measures displacements perpendicular to the plane.

8 Claims, 5 Drawing Sheets

U.S. PATENT DOCUMENTS

| | | | |
|---|---|---|---|
| 5,437,196 A * | 8/1995 | Okada .................... | 73/862.043 |
| 5,806,365 A * | 9/1998 | Zunino et al. ............ | 73/514.16 |
| 5,977,803 A * | 11/1999 | Tsugai ........................ | 327/94 |
| 6,901,801 B2 * | 6/2005 | Campbell et al. ......... | 73/514.32 |
| 7,305,883 B2 * | 12/2007 | Khuri-Yakub et al. ......... | 73/579 |
| 7,528,755 B2 * | 5/2009 | Hammerschmidt .......... | 341/143 |
| 2001/0004846 A1 * | 6/2001 | Kawai ..................... | 73/504.02 |

* cited by examiner

A - A

B - B $$\begin{bmatrix} Fx \\ Fy \\ Fz \\ Mx/l \\ My/l \\ Mz/l \end{bmatrix} = k \cdot \begin{bmatrix} 0 & 1 & 0 & 0 & 0 & 0 & 0 \\ 1 & 0 & -1 & 0 & 0 & 0 & 0 \\ 0 & 0 & 0 & -1 & -1 & 1 & 1 \\ 0 & 0 & 0 & 1 & -2 & -2 & 1 \\ 0 & 0 & 0 & -2 & -2 & 1 & 1 \\ 1 & 0 & -2 & 0 & 0 & 0 & 0 \end{bmatrix} \cdot \begin{bmatrix} \Delta C1 \\ \Delta C2 \\ \Delta C3 \\ \Delta C4 \\ \Delta C5 \\ \Delta C6 \\ \Delta C7 \end{bmatrix}$$

Fig 4

$$\begin{bmatrix} a_x \\ a_y \\ a_z \\ \ddot{\varphi}_x/I_x \\ \ddot{\varphi}_y/I_y \\ \ddot{\varphi}_z/I_z \end{bmatrix} = k \cdot \begin{bmatrix} 0 & 1 & 0 & 0 & 0 & 0 & 0 \\ 1 & 0 & 1 & 0 & 0 & 0 & 0 \\ 0 & 0 & 0 & 1 & 1 & 1 & 1 \\ 0 & 0 & 0 & -1 & 1 & 1 & -1 \\ 0 & 0 & 0 & -1 & -1 & 1 & 1 \\ -1 & 0 & 1 & 0 & 0 & 0 & 0 \end{bmatrix} \cdot \begin{bmatrix} \Delta C1 \\ \Delta C2 \\ \Delta C3 \\ \Delta C4 \\ \Delta C5 \\ \Delta C6 \\ \Delta C7 \end{bmatrix}$$

Fig 6

MULTI-AXIS CAPACITIVE TRANSDUCER AND MANUFACTURING METHOD FOR PRODUCING IT

BACKGROUND OF THE INVENTION

This invention relates to a multi-axis capacitive transducer and a manufacturing method for producing multi-axis capacitive sensors and actuators.

Micro-Electro-Mechanical-Systems (MEMS) comprise the integration of mechanical elements, sensors, actuators and electronics on a common silicon substrate through microfabrication processes. In the following context the term transducer is in a summarized manner used for capacitive sensors and for capacitive actuators.

The realisation of reliable force sensing during manipulation of micro-objects is an important objective of current research activities. At present, the most common technique used for force sensing in micromanipulation is that of strain gauges. Nowadays, micromanipulations are performed using either mobile micro-robots or a precise positioning device under control of an optical or scanning electron microscope. During the initial state of development, engineers have concentrated on the design of different micro-handling tools such as micro-grippers. Often sensor feedback is only given by the means of optical measurement, thus leading to a lack of information about the interaction forces between the end-effectors and the micro-components. In order to avoid breaking or damaging objects during the manipulation processes, force feedback is important for a proper functionality. To provide multi-axis force information is a requirement for complicated micromanipulation tasks.

Micro-machined accelerometers have been successful as commercial products. They are used for sophisticated control systems in airplanes and advanced automobiles. Many research has been done on a wide variety of sensing mechanisms, among them capacitive measurement. For new accelerometer technology to be attractive it must be low cost, reliable and perform well. Nowadays, no multi-axis accelerometers featuring 6 degrees of freedom measurement are commercially available.

Most multi-degrees of freedom sensors that have been developed in the last years are based on the piezo-electric effect. Only few works has been done on capacitive multi-degree of freedom sensors. The difference between state of the art capacitive multi-degrees of freedom sensors and the new sensor design presented here are discussed.

In <<A bulk micro fabricated multi-axis capacitive cellular force sensor using transverse comb drives>>, Sun Yu et al., Journal of Micromechanics and Microengineering, Vol. 12, 2002, pages 832-840, the design of a 2-DOF capacitive force sensor is presented. The disclosed sensor allows a measurement of forces only in the wafer plane Fx and Fy. Forces Fz perpendicular to the wafer plane and moments are not measurable.

A multi-axis micro accelerometer is presented in <<A 3-axis force balanced accelerometer using a single proof-mass>>, Mark A. Lemkin et al., Transducers 1997, International Conference on Solid-State Sensors and Actuators, Chicano, June 16-19, 1997, pages 1185-1188. Accelerations out of the wafer plane are measured by a change of overlapping area, which has a relatively small sensitivity. No capacitor plates in the xy-plane are used to measure displacements in z-direction.

The paper <<Detector for force/acceleration/magnetism with respect to components in multi-dimensional directions>>, U.S. Pat. No. 5,437,196, discloses a sensor design which is not suitable for micro-fabrication. Electrodes are attached to the sidewalls of the fixed part and the movable body of the sensor, but they are not part of the mechanical structure.

SUMMARY OF THE INVENTION

The present invention therefore addresses the problem to avoid the above mentioned drawbacks of the known <<force and acceleration sensors>> and to provide a multi-axis capacitive transducers which allow a measurement of a relative motion in all 6 degree's of freedom and can be produced requiring no assembly.

According to the present invention, a capacitive transducer with the features, where
  A part are movable in all directions of space;
  both sets of capacitor plates are forming a further plurality of capacitors arranged parallel and perpendicular to that plane;
  for each capacitor one capacitor plate has a larger surface area than the other in order that a displacement parallel to the two plates of said capacitor does not affect its capacity;

enables the measurement of forces in all 3 directions as well of torques in all 3 axes; by the feature, where a plate of one capacitor has an larger surface then the other one allows a direct and easy evaluation of the direction of an applied force or of the axes of a applied torque without affecting the other directions and axes.

Additionally, where both sets of capacitor plates are built on a wafer the transducer according to the present invention requires no assembly.

BRIEF DESCRIPTION OF THE SEVERAL VIEWS OF THE DRAWINGS

The invention will now be described in preferred embodiments with reference to the accompanying drawings wherein:

FIG. 4 calibration matrix for a force sensor according to FIG. 1;

FIG. 6 calibration matrix for a acceleration sensor according to FIG. 5 and

DETAILED DESCRIPTION OF THE INVENTION

Figure 1:
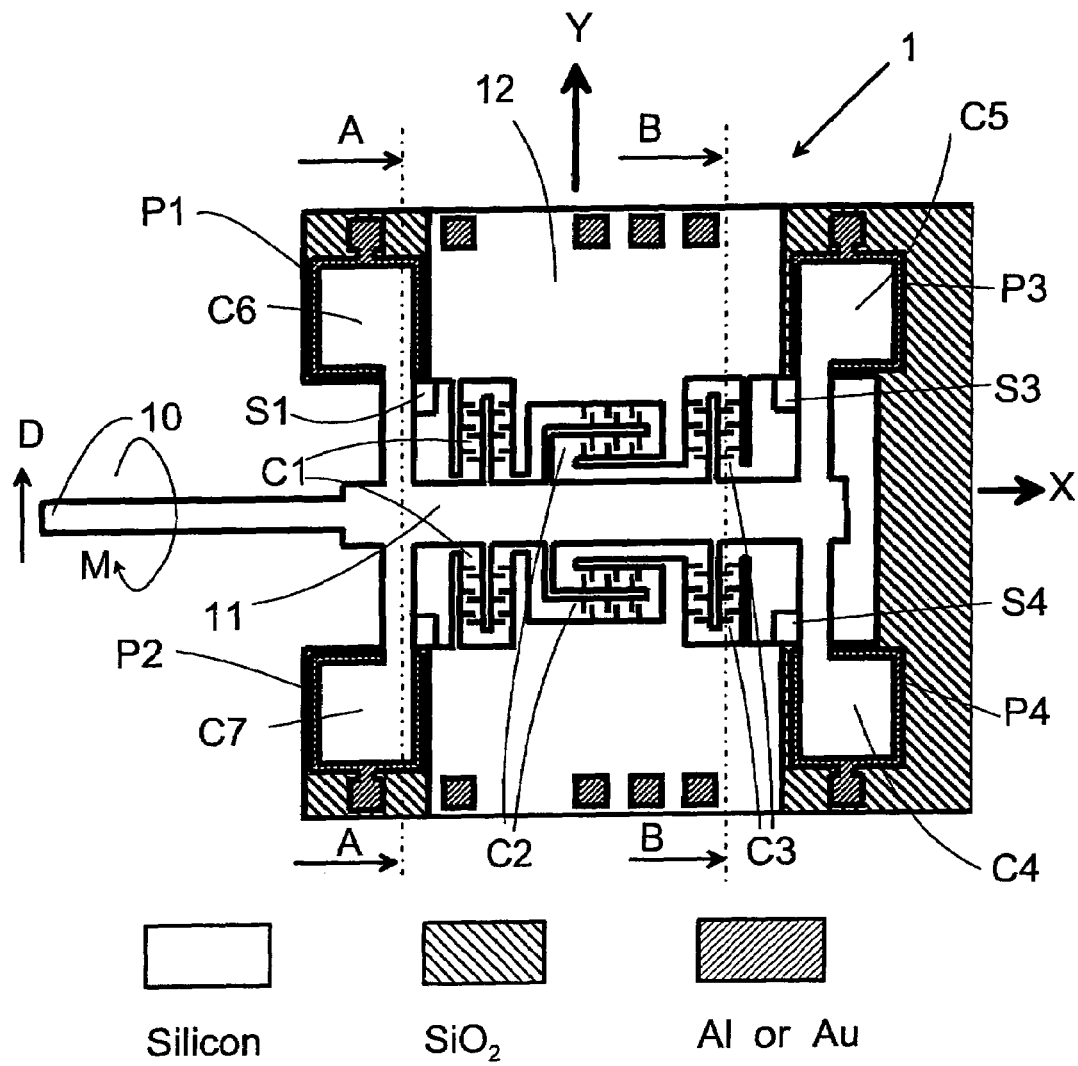
FIG. 1 Force sensor with deformable part build by 4 springs.
Figure 2:
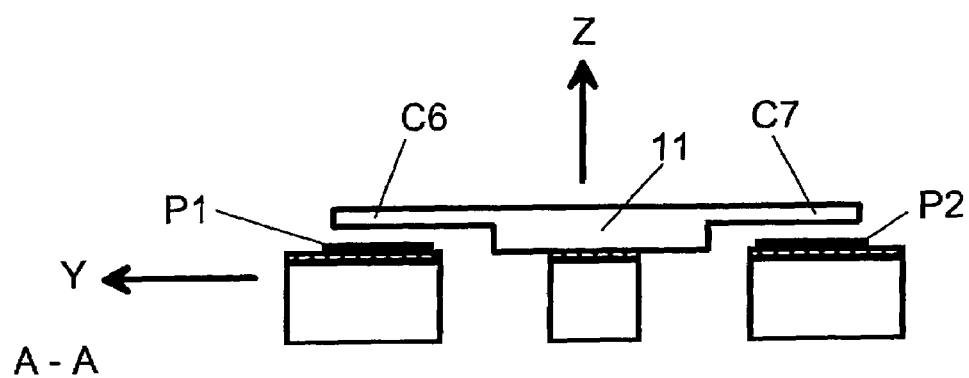
FIG. 2 cross sectional view of a force sensor according to FIG. 1 along A-A.
Figure 3:
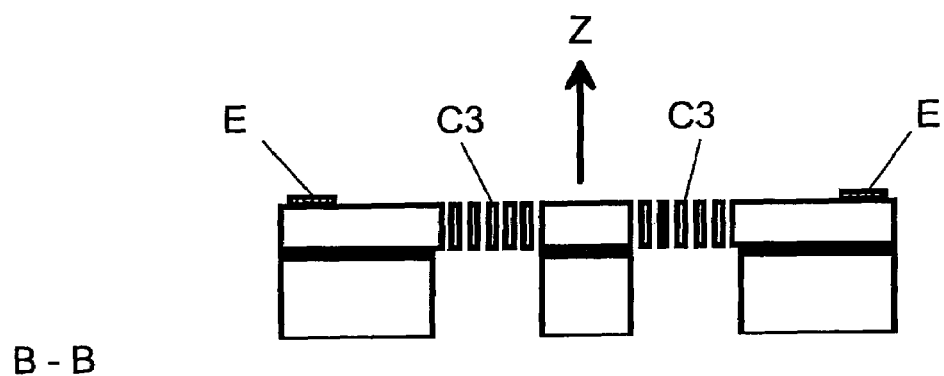
FIG. 3 cross sectional view of a force sensor according to FIG. 1 along B-B.

The explanation below refers first to FIG. 1. Capacitive micro force sensors 1 are principally built up by the two main parts:
  i) a deformable structure S1, S2, S3, S4; which transforms a force into a displacement.
  ii) pairs of capacitor plate forming capacitors C1, C2, C3, C4, C5, C6 and C7 to transform a displacement into a change of its capacitance. In the context of this paper the symbols C1, C2 denote the element <<capacitor>> as well as its <<capacitance>>.

To create a multi degree of freedom sensor 1, the deformable structure is designed such that a displacement in X-, Y- and Z-direction is possible. For the force sensor shown in FIG. 1, the deformable part is formed by four springs S1, S2, S3 and S4 with a perpendicular shape. The springs S1, S2, S3 and S4 are also used as electric conductors. For this reason, each spring S1, S2, S3 and S4 may be replaced by two or more springs with a lower stiffness, if more electric conductors are required for the read-out electronics. By changing the position, length and thickness of the springs S1, S2, S3 and S4, the resolution and the range of the sensor 1 can be chosen.

To measure the displacement of the movable body 11, the capacitance of the electrode pairs C1, C2, ..., C7 are measured. To get a better output signal, the capacitors C1, C2 and C3 are replaced by comb drives featuring multiple plate pairs. The capacitance C for each comb drive is given by the equation:

$$C = \epsilon_0 * n * A/d;$$

where $\epsilon_0$ is the dielectric constant, n the number of plate pairs, A the overlapping area and d the gap distance. To be precise: A denotes the surface area of the smaller plate of a capacitor, because the larger area does not contribute to the capacity. Most multi-degree of freedom force sensors 1 that had been designed in the past measure the change of capacitance by changing the overlapping area A for forces perpendicular to the XY-plane. Changing the gap d instead of the overlapping area provides a high change of capacitance for a small displacement $\Delta d$ and thus increases the resolution of the sensor.

To obtain a linear output, a differential comb drive structure is used for the capacitors C1, C2 and C3. For the capacitors C4, C5, C6 and C7 a linear output is obtained by measuring directly the impedance instead of its capacitance.

The measurement takes places as follows, cf. FIG. 1:
i) The capacitor plates of the capacitors C1 and C3 have to be oriented parallel to the xz-plane.
ii) The capacitor plates of the capacitor C2 have to be oriented parallel to the yz-plane.
iii) The capacitor plates of the capacitor C4, ..., C7 have to be oriented parallel to the xy-plane.
i') To determine the force Fx, the deflection in x-direction is measured via the capacity of the capacitor C2.
ii') To determine the force Fy, the capacity C1 and C3 are measured and the force Fy is calculated from that.
iii') To determine the force Fz, the capacity C4, C5, C6 and C7 are measured and the force calculated from that.
iv) To determine the torque Mx in the x-axis, the capacity C4, C5, C6 and C7 are measured and the torque Mx is calculated from that; the torque Mx is in FIG. 1 generally denoted by M.
v) To determine the torque My in the y-axis, the capacity C4, C5, C6 and C7 are measured and the torque Mx calculated from that.
vi) To determine the torque Mz, in the z-axis, the capacity C1 and C3 are measured and the force calculated from that.

FIG. 4 shows an example of a calibration matrix for the (force) sensor 1 according FIG. 1.

l is the length from the tip of the probe 10 to the origin. k is a constant which is given by the sensitivity of the readout electronics.

The insulation of the different capacitors is realized by etching gaps into the top layer. To resolve six degrees of freedom at least six independent capacitive measurements are required. The design in FIG. 1 features seven electrode pairs C1, ..., C7. One of the pairs C4, ..., C7 is redundant and is only used to improve the signal to noise ratio. The lower plates of capacitor C4, ..., C7 have a larger area than the upper plate. A movement of the movable body 11 in x- or y-direction doesn't change the overlapping are because of that. This design enables a complete decoupling of the measurement of the forces Fx, Fy and the torque Mz from the measurement of the force Fz and the torques My and Mz.

Figure 5:
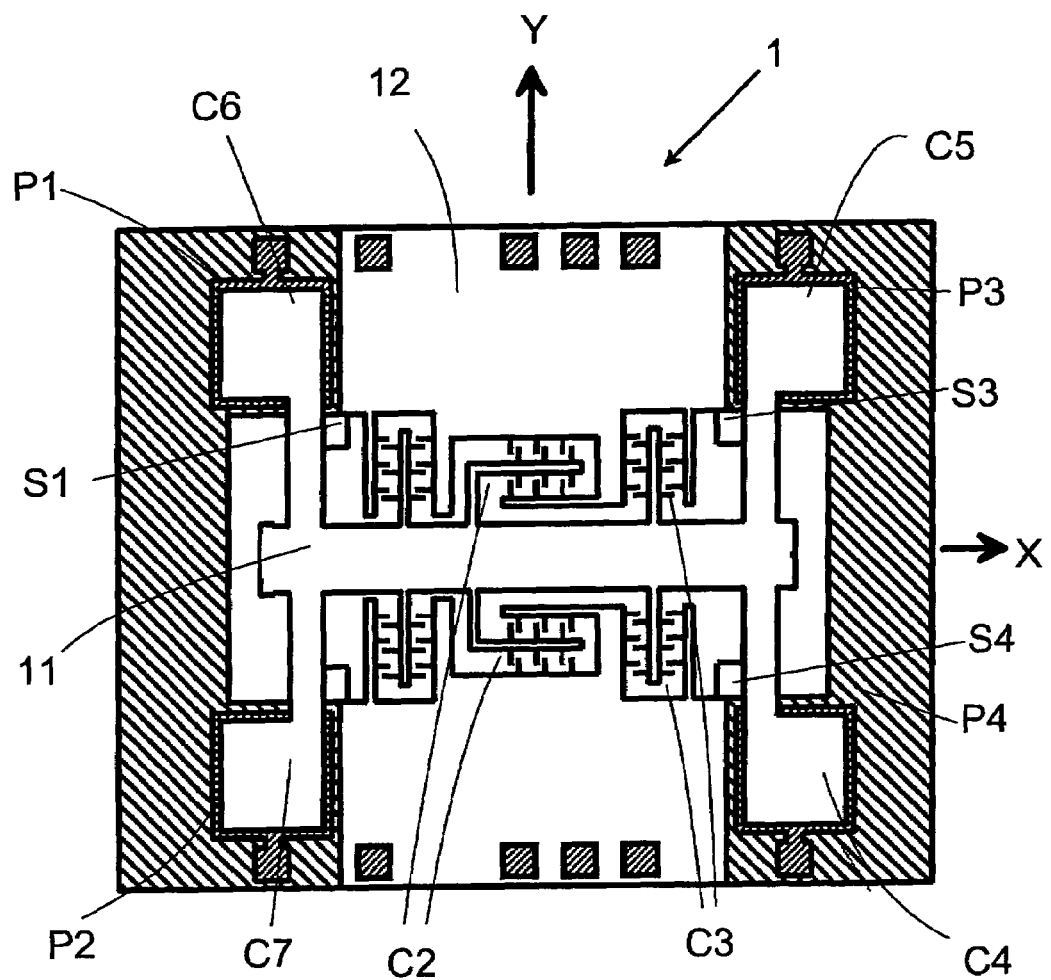
FIG. 5 acceleration sensor based on a force sensor.

FIG. 5 shows a modified version of the force and torque sensor 1 according to FIG. 1 to be used as an accelerometer. The meaning of the hatched areas is the same as de-noted in FIG. 1. The central movable body 11 is used as a single proofed mass. The probe 10 isn't required for an accelerometer. The forces and moments that are acting on the movable body 11 are given by the equations:

$$F = m \cdot a$$

and $$M = I \ddot{\phi}$$

m denotes the mass of the movable body 11 and a the acceleration on the sensor 1. An example of a calibration matrix for the accelerometer according to FIG. 5 is characterised by the calibration matrix in FIG. 6.

Electrostatic Actuator

The design of the force sensor 1 according to FIG. 1 can be used as an actuator when a voltage difference is applied over the capacitor plates. The force acting perpendicular to the plates is given by the equation:

$$F_{electrostatic} = -\frac{1}{2} \frac{\varepsilon_0 A V^2}{2d}$$

where $\epsilon_0$ is the dielectric constant, A the area of the capacitor plates, V the Voltage difference between the plates of the capacitors C4, C5, C6 and C7 and d the gap between the plates.

This configuration can exert forces and torques to micro parts to manipulate them.

The design of the force sensor according to FIG. 1 can be used as a position sensor to measure distances along the x-, y- and z-axis with a resolution in the [nm] range.

Figure 7:
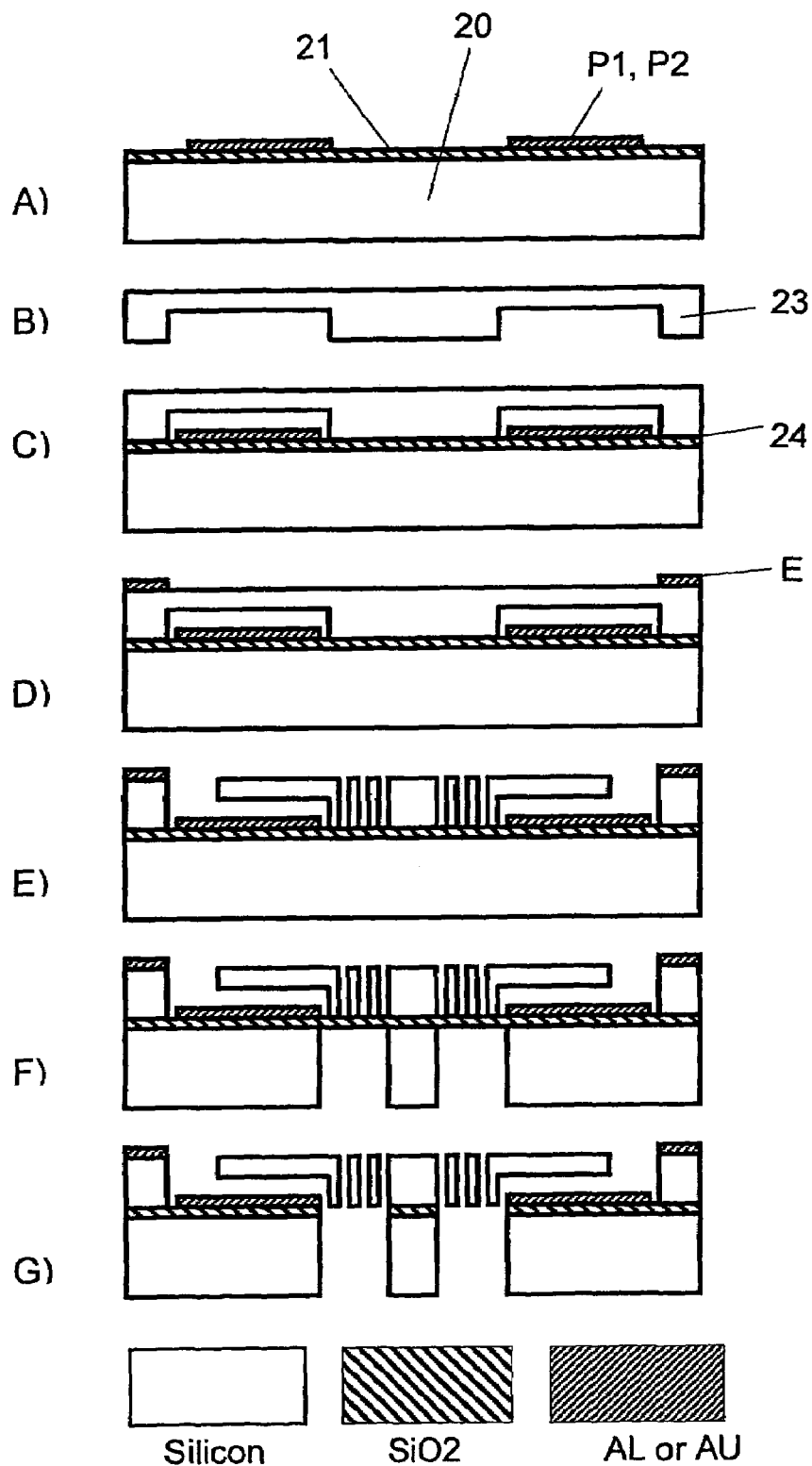
FIG. 7 steps of a manufacturing method for the production of devices according to FIG. 1 or 5.

FIG. 7 shows the manufacturing method of the transducers according to the invention. The meaning of the hatched areas is the same as denoted in FIG. 1. Two wafers 20 and 23 are required. The first one is a silicon wafer 20 of a thickness of 500 µm and a layer 21 of 1 µm SiO2 on top of it. The layer 21 is an electrical isolation layer. The second wafer 23 is a p-type silicon wafer with a thickness of 100 µm. A total of 5 masks denoted by mask1, ..., mask5 are required for the process. The steps for the production process comprise:

A) The lower electrodes are evaporated on the insulating layer of wafer 20, using mask1. The metal used for evaporation is either gold Au or aluminium Al.
B) Trenches are etched into the wafer 23 using mask2.
C) Wafer 20 and wafer 23 are bonded together using low temperature bonding or gluing 24.
D) Ohmic contacts 25 are evaporated using mask3.
E) Topside is etched, including the deformable structure and the comb drives using mask4.
F) Backside of the wafer is etched using mask5.
G) The electrical insulating layer 21 of SiO2 is removed using reactive ion etching to release the devices.

No assembly is required to manufacture the sensors. Instead of wafer-bonding a surface micro machining process can be used to create the electrodes measuring deflections in Z-direction.

LIST OF REFERENCE NUMERALS AND SYMBOLS

1 Transducer, sensor, actuator
10 counter lever, probe
11 movable body of the transducer
12 non movable part of the transducer, fixed part of the transducer
20 silicon substrate, $1^{st}$ wafer, silicon wafer
21 electrical isolation layer
22 lower electrode plates
23 $2^{nd}$ wafer, conductor
24 bonding, gluing
25 ohmic contacts
A area overlapping area
a acceleration
ax, ay, az acceleration components
D gap distance
Δd displacement
C1, C2, C3, C4, C5, C6 capacitor plate pair, electrode pair, its capacitance
∈0 dielectric constant
Fx, Fy, Fz force components
$\ddot{\phi}_x, \ddot{\phi}_y, \ddot{\phi}_z$ rotational accelerations
P1, P2, P3, P4 Elektrode, plate
Mx, My, Mz moment components
a mass of movable body
n number of plate pairs
S1, S2, S3, S4 deformable structure, spring
V Voltage
X, Y, Z; x, y, z Directions; coordinates

LIST OF ACRONYMS

MEMS Micro-Electro-Mechanical-Systems
DOF Degree's of freedom

The invention claimed is:

1. A capacitive transducer comprising:
   a first part containing a first set of capacitor plates;
   a second part movable, in a plane, relative to the first part, the second part containing a second set of capacitor plates;
   said first and second sets of capacitor plates being built on a substrate, the capacitor plates forming a plurality of capacitors, wherein
   the second part is relatively movable in all six degrees of freedom;
   one capacitor plate of each of said first and second sets of capacitor plates having a larger surface area than the other capacitor plate so that a displacement parallel to the two plates of said set of capacitor plates does not affect its capacity; and
   one of the plurality of capacitors measuring displacements in a plane and another of the plurality of capacitors measuring displacements perpendicular to said plane via a change of a gap between the capacitor plates of each capacitor.

2. The capacitive transducer according to claim 1, wherein the capacitive transducer is an actuator, where its motion and a resulting displacement is caused by a voltage applied to at least one capacitor.

3. The capacitive transducer according to claim 1, wherein the capacitive transducer is a sensor, and
   a counter lever is fixed with the movable part and a displacement of the relative motion is caused by a force applied on that counter lever.

4. The capacitive transducer according to claim 1, wherein the capacitive transducer is a sensor, and
   a displacement of the relative motion is caused by an acceleration generating a force on the movable part.

5. The capacitive transducer according to claim 1, wherein the relative motion causes a change of the gap distance between two capacitor plates of at least one capacitor.

6. The capacitive transducer according to claim 1, wherein the second part and the first part are mechanically connected via a deformable structure.

7. The capacitive transducer according to claim 6, wherein the deformable structure is built with the same substrate as the capacitor plates.

8. A method for producing multi-axis capacitive transducers, wherein a multi-axis capacitive transducer has a first wafer and a second wafer, comprising the steps of:
   A) evaporating lower electrodes of the first wafer on an electrical insulating layer of said first wafer using metal for evaporation;
   B) etching trenches into the second wafer;
   C) bonding the first wafer and the second wafer together using low temperature bonding or gluing;
   D) evaporating ohmic contacts on the second wafer;
   E) etching a-topside of the second wafer;
   F) etching a backside of the first wafer; and
   G) removing the electrical insulating layer using reactive ion etching.

* * * * *